US006956824B2

(12) United States Patent
Mark et al.

(10) Patent No.: US 6,956,824 B2
(45) Date of Patent: Oct. 18, 2005

(54) EXTENSION OF LINK AGGREGATION PROTOCOLS OVER THE NETWORK

(75) Inventors: Barry Ding Ken Mark, Kanata (CA); Walter Joseph Carpini, Stittsville (CA)

(73) Assignee: Tropic Networks Inc., Kanata (CA)

( * ) Notice: Subject to any disclaimer, the term of this patent is extended or adjusted under 35 U.S.C. 154(b) by 909 days.

(21) Appl. No.: 09/879,939

(22) Filed: Jun. 14, 2001

(65) Prior Publication Data

US 2003/0128706 A1  Jul. 10, 2003

(51) Int. Cl.[7] .............................................. H04L 12/26
(52) U.S. Cl. ..................................... 370/242; 709/241
(58) Field of Search ............................... 370/235, 237, 370/238, 238.1, 242, 351, 360, 386, 389, 370/395.21, 411, 412, 413, 417, 419, 421, 370/428, 216, 248, 396, 401, 402, 359; 709/241; 714/48, 798, 799, 56

(56) References Cited

U.S. PATENT DOCUMENTS 5,610,904 A * 3/1997 Eng et al. .................... 370/408
6,167,025 A * 12/2000 Hsing et al. ................. 370/216
6,501,757 B1 * 12/2002 Kamaraj et al. ......... 370/395.41

OTHER PUBLICATIONS

The ATM Forum, Technical Committee, Inverse Multiplexing for ATM (IMA) Specification Version 1.1, AF-PHY-0086.001, Mar. 1999.
"Amendment to Carrier Sense Multiple Access with Collision Detection (CSMA/CD) Access Method and Physical Layer Specifications—Aggregation of Multiple Link Segments", IEEE Std 802.3ad-2000, (approved Mar. 30, 2000 IEEE-SA Standards Board), pp. 95-173.

* cited by examiner

Primary Examiner—Wellington Chin
Assistant Examiner—Brenda Pham
(74) Attorney, Agent, or Firm—Victoria Donnelly

(57) ABSTRACT

An extension of a Link Aggregation Protocol (LAP) over the network allows current Ethernet point-to-point LAPs to operate across a Metropolitan Area Network (MAN). A maximum disjoint path algorithm allows selection of a plurality of alternative end-to-end physical routes between two data terminals. These physical routes share a minimum number of nodes and physical links. End-to-end logical links are then formed by a plurality of successive physical links between nodes containing protocol compatible devices, the physical links being selected based on their physical characteristics such as bandwidth and delay. Multiple logical links can be provisioned, without dedicating, between any two data terminals over the network. The logical links provide the virtual point-to-point links that the edge LAP devices require. The extension of LAP/s over the network provides increased availability because a network failure can now be propagated to the edge of the network to allow the edge LAP devices to quickly react to the failure.

25 Claims, 4 Drawing Sheets

FIGURE 3
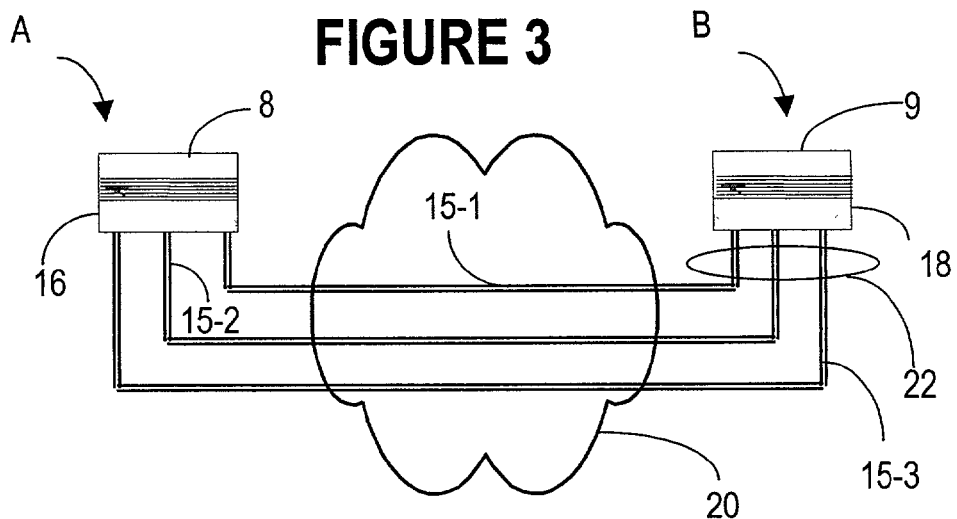
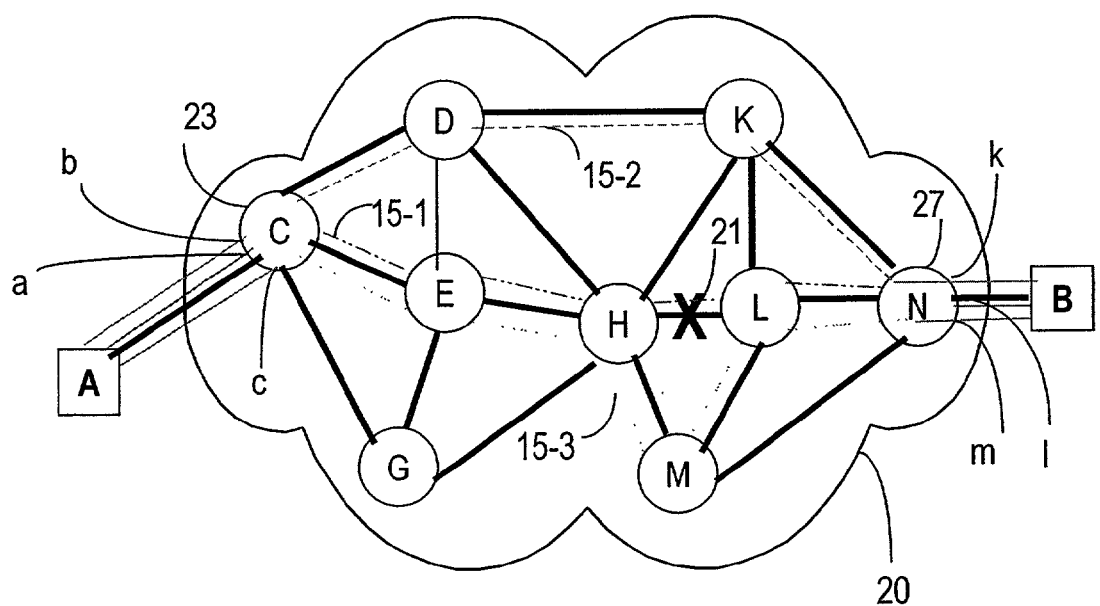
FIGURE 4A

EXTENSION OF LINK AGGREGATION PROTOCOLS OVER THE NETWORK

FIELD OF THE INVENTION

This invention is directed to a communication network, and more specifically to a method of connecting devices implementing a Link Aggregation Protocol (LAP) over a Metropolitan Area Network (MAN).

BACKGROUND OF THE INVENTION

A Metropolitan Area Network (MAN) is a communications facility allowing a number of devices to communicate with each other and generally includes workstations, interface components, connecting cables and/or fiber optics, and software for controlling the access and flow of information over the network. The MAN extends, as the name suggests, over a geographical area of a large city and uses, for example, switched Ethernet, ATM or POS as the communication protocol. The typical data rates used by MAN have increased lately from 100 Mbps to 1 Gbps and even to 10 Gbps, and new transmission protocols are under construction as specified within, for example, the IEEE 802.3 standard.

Ethernet started as a connectionless local area network (LAN) technology designed for data applications in which all stations on the network share the communication medium. The medium is shared in a peer-to-peer fashion and all devices can be reached by a single data transmission using an Ethernet frame. The protocol data unit for Ethernet is a variable length frame with a 48-bit media access control (MAC) address.

Common carrier communication links typically include relatively low speed twisted pair communication links like T1 in North America, providing a maximum data rate of 1.544 Mps, or E1 available in Europe at 2.048 Mps. High speed optical based communication links like T3 provide a maximum data rate of 45 Mps, while E3 provides 34 Mps. Networks requiring an intermediate level bandwidth, e.g. 10 to 20 Mps, must use the high speed T3/E3 carrier. This unnecessarily increases the cost of communication as the subscription rate for T3/E3 is much higher than for T1/E1, the subscriber being compelled to pay for unused bandwidth. In addition, high-speed T3/E3 links are not widely available.

It has become evident that the shared bus architecture is insufficient to meet the demands of applications that require large bandwidth, and that MANs are beginning to become a bottleneck for the modern telecommunication networks. Thus, switched Ethernet technology was developed to provide more capacity to the end-user. Rather than relying on a shared medium, this technology provides point-to-point bandwidth between the user station and the switch, so that instead of sharing, for example a 100 Mbps connection, the user gets a dedicated 100 Mbps connection.

The carrier sense multiple access with collision detection (CSMA/CD) standard defines data encapsulation/decapsulation, and media access management functions performed by the MAC sublayer. A link aggregation protocol/s (LAP), such as the LAP proposed by IEEE 802.3ad, allows one or more links to be aggregated together to form a link aggregation group, such that a MAC Client can treat the group as if it were a single link. To this end, it specifies the establishment of terminal-to-terminal logical links, consisting of parallel instances of point-to-point physical links operating at the same data rate. See "CSMA/CD Access Method and Physical Layer Specifications, IEEE Std 802.3ad-2000, Aggregation of Multiple Link Segments", March, 2000, the content of which is incorporated herein by reference.

This point-to-point architecture has some disadvantages when the end users are located far apart. Namely, in most such cases a new physical connection needs to be established, since it is not normally easy to provision this connection over an arbitrary MAN mesh. As a result, two IEEE 802.3ad devices are generally directly connected by physical point-to-point links. This also holds true in the case of a fault in the network, where it is not easy to route the point-to-point traffic on an alternative route.

Accordingly, there is a need to provide a more flexible way of connecting two end users across a MAN.

Inverse Multiplexing for ATM (IMA) is a method for providing modular bandwidth for users accessing an ATM network, as well as for connecting ATM network elements at rates between the T1/E1 and T3/E3 levels. Asynchronous transfer mode (ATM) is a high-speed connection oriented cell-switched communications technology. Amongst other information, the ATM header contains a virtual path identifier (VPI) and a virtual channel identifier (VCI), which together form a Virtual Circuit. All the cells of a Virtual Circuit ( i.e. cells having the same VPI and VCI) follow the same path through the network. This path is determined during the call set-up procedures or by assignment.

IMA combines several physical links to collectively make up an IMA group arranged as an IMA virtual path between two specified devices. See for example the ATM Forum, "Inverse Multiplexing for ATM (IMA) Specification", Version 1.1, March, 1999, the contents of which are incorporated herein by reference. The ATM inverse multiplexing (IMA) provides an effective method for combining multiple T1/E1 links selected to collectively provide higher intermediate rates on logical links.

Again, the IMA group is comprised of dedicated logical links connecting two specified devices. However, this protocol is specifically designed for ATM cells and can not be applied as such to Ethernet frames.

Accordingly, there is a need to provide multiple, controllable connections over the network between any two devices capable of implementing link aggregation protocols (LAP), by provisioning, without dedicating, logical links over the MAN.

SUMMARY OF THE INVENTION

The present invention seeks to overcome the disadvantages of the prior art associated with the connectivity of devices implementing LAPs over a MAN.

According to one aspect of the invention, a method for extending a LAP between a first data terminal and a second data terminal physically connected over a communication network is provided. The method comprises receiving a request to establish a connection between the data terminals, the connection being defined by specific traffic parameters; detecting a plurality of maximally disjoint paths between the data terminals; and establishing the connection over two or more logical links along a respective two or more maximum disjoint paths.

According to another aspect of the invention, a switching node of a communication network for routing traffic between a near end and a far end data terminals, is provided. The switching node comprises a plurality of input ports and output ports, each port having specified traffic parameters; a link aggregation interface for assigning an input port and a corresponding output port to a physical route between the near end and the far end data terminals under supervision of a node controller; and a switch for routing traffic between the input port and the corresponding output port according to a connectivity map and establishing communication between the near end and the far end data terminals along a logical link.

According to yet another aspect of the invention, multiple logical links may be created to connect network devices implementing a LAP. An efficient provisioning of bandwidth is obtained in physical link increments, while avoiding use of the costly high speed carriers. Advantageously, the extension of LAPs over the network provides increased availability because a network failure can now be propagated to the edge of the network to allow the edge LAP devices to quickly react to the failure. A failure at the edge of the network is also propagated to the other edge allowing that edge device to react to the far edge failure.

The "Summary of the Invention" does not necessarily disclose all the inventive features. The invention may reside in a sub-combination of the disclosed features.

BRIEF DESCRIPTION OF THE DRAWINGS

The invention will be now explained by way of example only and with reference to the following drawings:

FIG. 3 illustrates two devices implementing a LAP according to the invention;

FIG. 4A is a diagram showing alternative logical links provisioned over the network between two network devices;

Similar references are used in different figures to denote similar components.

DETAILED DESCRIPTION

The following description is of a preferred embodiment by way of example only and without limitation to combination of features necessary for carrying the invention into effect.

A network architecture defines protocols, message formats, and other standards to which all the devices and software must adhere. Functional network layers are established within a network architecture, each layer for performing a specific set of functions and a specific set of services. Protocols define the services covered across a layer interface, as well as the rules followed for performing that service.

Figure 1A:
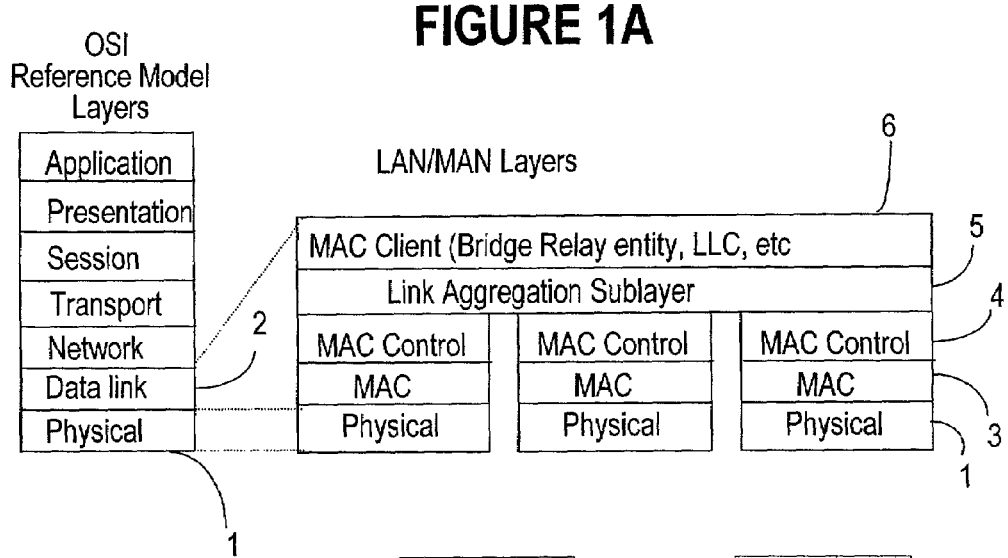
FIG. 1A illustrates the OSI reference model for an access network using a link aggregation sub-layer.

FIG. 1A illustrates the OSI reference model, for an access network using a link aggregation sub-layer.

The International Standards Organization (ISO) proposes a seven layer reference model for computer networking, which are still used to design standards for the communication networks architecture. Only link layer 2 is of relevance to this invention. Thus, the network, transport, session presentation, and application layers are not discussed, as they are not relevant to this invention. The physical layer 1 can be any of optical fiber, twisted pair, coaxial cable, wireless.

The MAC sub-layer 3, the MAC control sub-layer 4, and the MAC Client 6 are known as the data sub-link layers. In the case of traffic ramping-on an Ethernet network, these sub-layers are responsible for assembling the data received from the upper layers into frames and providing the frame with a Media Access Control (MAC) address. For the traffic ramping-off the Ethernet network, these sub-layers are responsible with extracting data from the incoming frames.

The IEEE 802.3ad protocol defines the specific requirements for LANs and MANs to perform aggregation of multiple link segments. These networks are provided with a link aggregation sub-layer 5 which allows one or more links, having same traffic characteristics (e.g. same bandwidth and delay) to be aggregated together to form a Link Aggregation Group (LAG) such that the MAC Client sub-layer 7 can treat the LAG as a single link.

Link Aggregation Control (LAC) is a function which configures and controls the link aggregation sub-layer 5. A "physical link" is defined as the physical connection medium between two successive data terminals of the access network. The LAC function determines the physical links that may be aggregated, enables a distributor and/or a collector to aggregate physical links into a logical link, assigns to, or detaches ports from the aggregator, and continuously monitors the aggregation to determine when changes are needed.

Physical links are aggregated according to the operational keys of the end ports, which reflect, for example, port rate, duplexity, type of traffic, and various administrative constraints. One of the two terminals is designated as the "controlling system" for avoiding overlapping activities, i.e. if both terminals would be able to change operational keys this can create confusion.

The Link Aggregation Control Protocol (LACP) used by LAC sub-layer automatically executes the LAC functions using peer exchanges across the respective logical links to determine and implement aggregation, and provides the maximum level of aggregation capability achievable. The configuration mechanism continuously monitors for changes in the physical link state that require reconfiguration and corrects a mis-configuration by performing re-configuration and/or by taking mis-configured links out of service. The configuration achieved is made independent of the order in which events occur, and is determined by the combination capabilities of the individual links based exclusively on their physical characteristics.

Figure 1B:
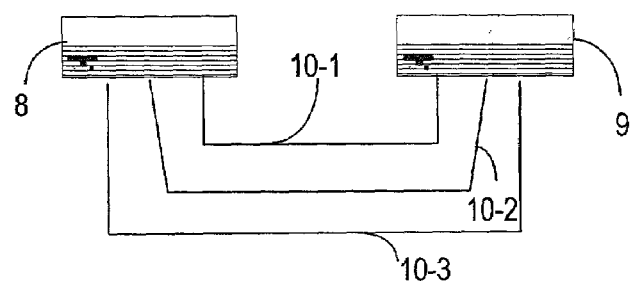
FIG. 1B shows a point-to-point connection for the current LAPs.

As shown in FIG. 1B this link aggregation protocol requires the devices 8 and 9 to be directly connected by physical point-to-point (p2p) links 10-1, 10-2 and 10-3.

Figure 2A:
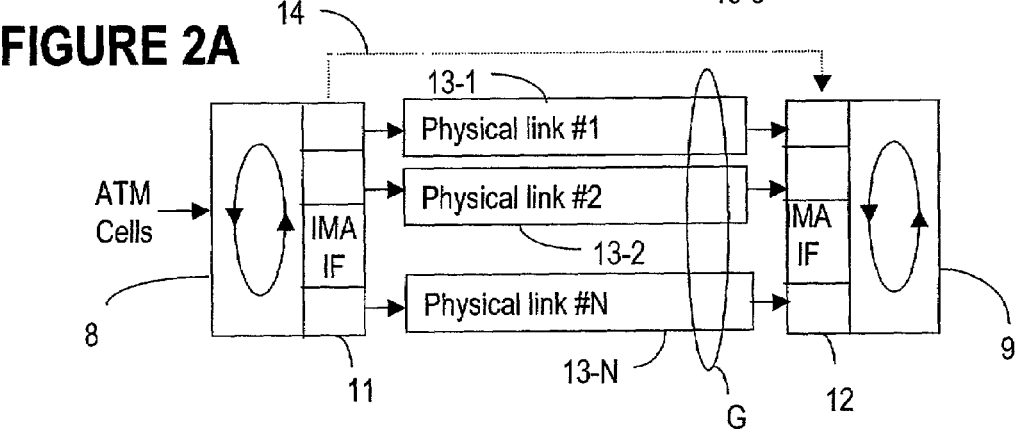
FIG. 2A is a an illustration of multiplexing/demultiplexing of ATM cells over inverse multiplexed links.

FIG. 2A shows another type of link aggregation, known as inverse multiplexing for ATM (asynchronous transfer mode) IMA. IMA provides modular bandwidth for user access to an ATM network and for connection between devices into the network at rates between the traditional rates. As shown, several physical links 13-1 to 13-N are combined into an IMA group G arranged as an IMA virtual path 14 between two specified devices provided with IMA interfaces 11 and 12. For clarity, the virtual path 14 is a suggested representation of the IMA group G.

Figure 2B:
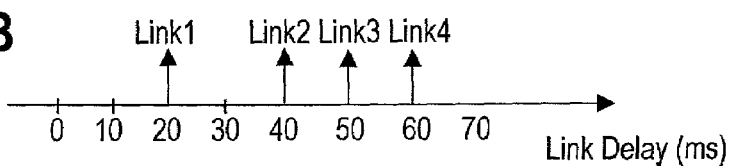
FIG. 2B illustrates the delays of various links aggregated as in FIG. 2A.

The IMA protocol operates on interfaces running at the same nominal Link Cell Rate (LCR) and implies the creation of an IMA specific Transmission Convergence (TC) layer positioned between the physical layer and the ATM layer (not shown). At the near end (NE) interface 11, a single ATM flow is converted at network element 8 into multiple ATM streams by distributing the ATM cells across "N" links in a cyclic round-robin sequence, and a cell-by-cell fashion, according to a transmission direction. At the far end (FE) interface 12, the cells arriving on individual links 13-1 to 13-N are re-combined according to a receiving direction to retrieve cells using a similar cyclic round-robin sequence and cell-by-cell basis. Thus, the original ATM flow is recovered, while compensating for the delays shown for example in FIG. 2B. In any event, all cells transmitted by NE device 8 are carried by the IMA virtual path 14 at the FE device 9, and the cells shall only be terminated by the FE interface 12 located at the far end of the virtual path 14. Lastly, the re-assembled ATM flow is sent to an ATM layer.

However, as indicated above, this type of link aggregation is designed for ATM cells, which have a fixed length, and thus the delays can be controlled and handled accordingly.

The present invention is concerned with a method that allows extension of the current point-to-point Ethernet LAP to operate across a communications network. The principle of operation of the present invention is shown in FIG. 3. In the following description, the term 'end-to-end logical link' refers to a connection between two data terminals equipped with a link aggregation interface according to the invention. An end-to-end logical link is made-up of a plurality of successive physical links between the nodes of a network 20, the physical links having varying operational parameters, such as bandwidth, delay, administrative costs, etc.

The idea is to provision multiple connections between any two data terminals 8 and 9 over the network 20 by creating end-to-end logical links as shown at 15-1 to 15-3 by way of example. Data terminals 8, 9 are in this case, for example, Ethernet devices provided with link aggregation interfaces 16 and respectively 18, as will be shown in further detail in connection with FIGS. 4A and 4B. The logical links 15-1 to 15-3 provide the virtual point to point connectivity which the data terminals normally expect.

The logical links are so selected so as to be maximally disjoint, and have similar characteristics (bandwidth, delay, administrative cost, etc) using a multi constraint and maximally disjoint path algorithm. The maximum disjoint path algorithm is based on a modified Dijkstra-type algorithm, and allows selection of a plurality of alternative end-to-end physical routes between the data terminals, the routes sharing a minimum number of nodes and physical links.

Such an algorithm is described in a patent application entitled: "Method and Apparatus for Selecting Multiple Paths Taking Into Account Shared Risk", Pieda et al., assigned to the same assignee, filed concurrently herewith and incorporated herein by reference. In this application, methods, systems and computer readable media are provided which facilitate the selection of multiple paths through a network represented by a network topology which take into account shared risk which may exist between network resources. The method involves identifying a first path through the network topology from a source node to a destination node, the first path comprising a first sequence of network resources. For at least one shared risk group, a determination is made if any of the at least one shared risk group includes any of the first sequence of network resources, a shared risk group being a group of network resources within the network topology which have a shared risk. A topology transformation is performed of the network topology into a virtual topology which discourages the use of network resources in any shared risk group determined. A second path through the virtual topology is identified from the source node to the destination. The method may be adapted to encourage node and/or edge disjointness.

To summarize, network 20 is a "smart network", comprising dynamically re-configurable switches and is capable of monitoring, correcting and reserving end-to-end physical routes after the access ports to be connected and the traffic parameters are set. Once the physical routes are established, network 20 monitors the logical links and takes appropriate action/s upon any network significant event.

FIG. 4A is a diagram showing alternative logical links provisioned over the "smart" network 20 comprising a plurality of nodes C, D, E, G, H, K, P, M, and N. In this example, data devices A and B are connected to end nodes, or edge nodes C and N respectively, to provide communication between terminals A and B over network 20. When a request for an A-B connection is received by network 20, network 20 detects a plurality of physical routes using the maximally disjoint path algorithm. The network then selects a number of logical links that in combination can satisfy the operational parameters of the connection provided in the request, and allocates corresponding ports to logical links. If, for instance, the logical links that perform as requested by the A-B connection are logical links 10-1, 10-2, and 10-3; and if, for instance, switching node 23 has input ports a, b and c and node 27 has output ports k, l and m allocated to the requested connection; then the ports that communicate along the same logical link, such as for example input port a and corresponding output port l communicating over logical link 15-1, must have paired operational parameters.

If a failure occurs in the network, as shown at 21 on the span between nodes H and L, the network 20 quickly reacts to this event. However, the data terminals A and B are not directly connected to the ends of the failed span H–L, so that they are unaware of the failure. According to the invention, the information regarding the failure 21 inside the network 20 is propagated towards the edge nodes C and N where the data devices A and B are connected. A failure at the edge, port a, b or c at edge node C, is also propagated to the far edge node N ports k, l or m.

Figure 4B:
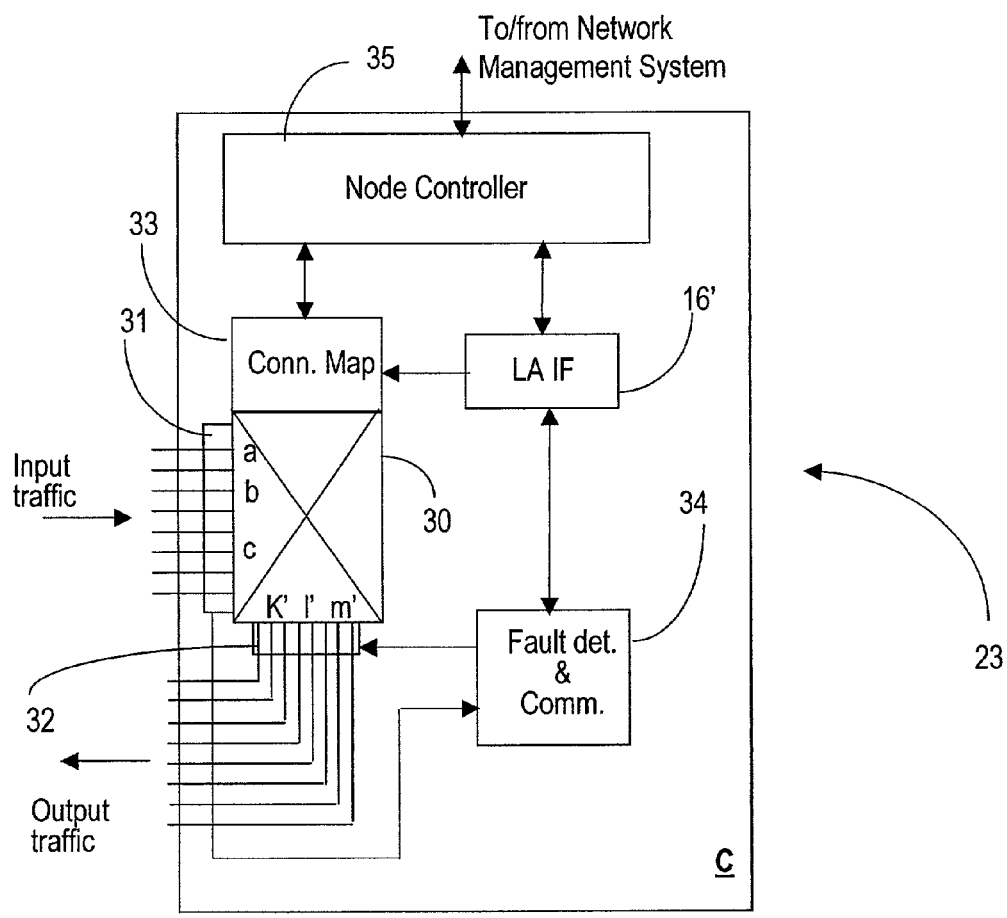
FIG. 4B is a block diagram of a node of network shown in FIG. 4A.

FIG. 4B shows a block diagram of a switching node 23 of network 20, equipped with a link aggregation interface 34 according to the invention. FIG. 4B shows only the blocks of the node that are relevant to the invention. A node 23 is generally equipped with a switch 31 for routing the traffic from the input ports 31 to the output ports 32, according to a connectivity map 33, as instructed by a node controller 35. FIG. 4B also shows the link aggregation interface 16' corresponding to interface 16 on the data device A. Link aggregation interface 16' is responsible for maintaining a list of logical links which are being used by this invention. This information is provided by the node controller 35 in conjunction with the other nodes of network 20. Also illustrated at node 23 is a fault detection and communication block 34 that is used to determine a fault in an input signal and to provide this information with the output signal. It is to be noted that block 34 illustrates the detection and communication of a fault intuitively; the actual implementation of this functionality is not the object of the invention. The idea is that in general, the nodes at the ends of a failed span have means for detecting and communicating that a fault occurred. Once this information becomes available at node 23, block 34 propagates this information to edge nodes C and N over network 20. A similar fault detection and fault communication mechanism exists on the internal nodes. This mechanism allows the faults on internal network links to be propagated to the edge nodes C and N.

Figure 5:
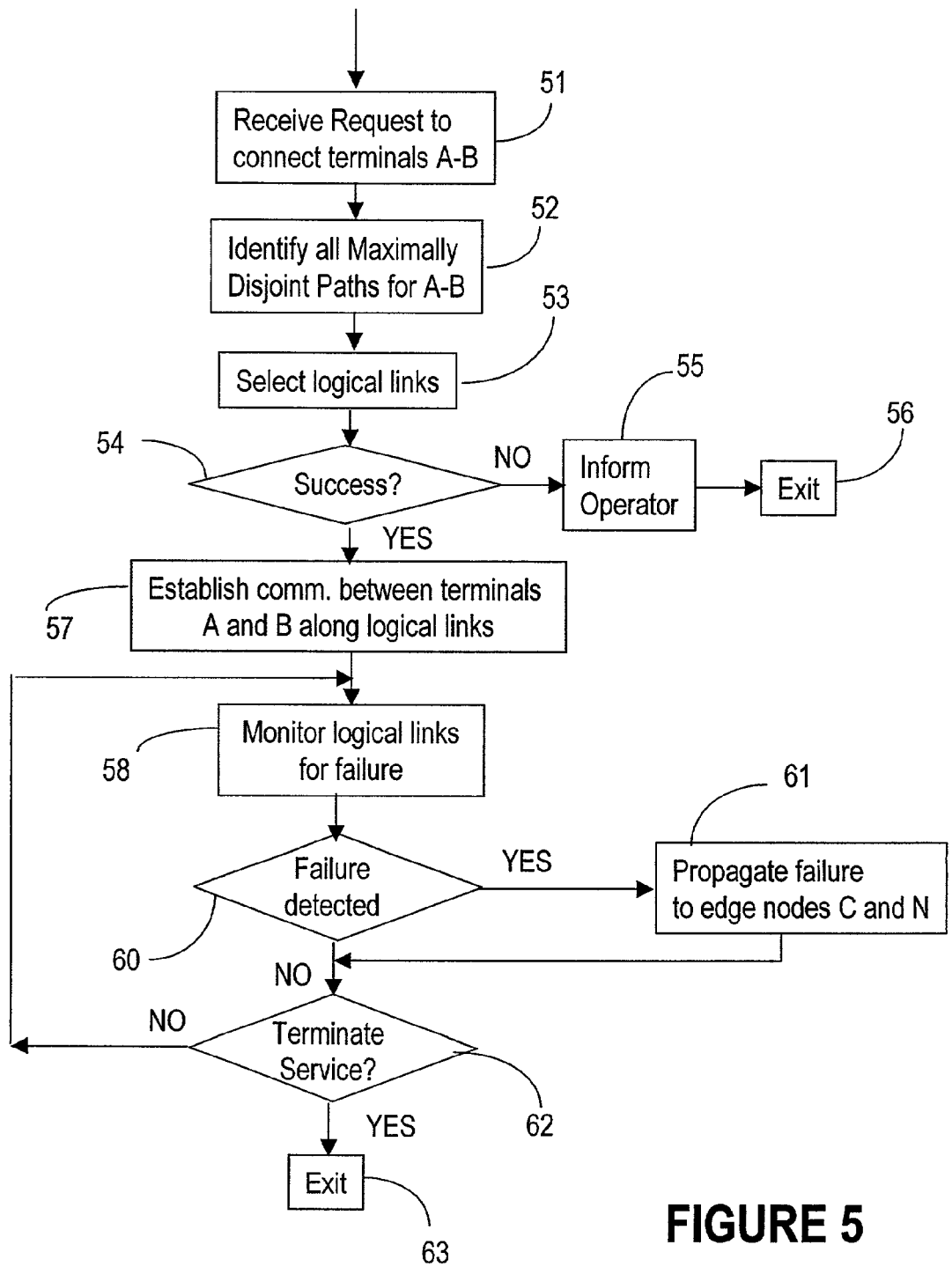
FIG. 5 is a flow chart for illustrating the LAP according to the invention.

FIG. 5 is a flow chart illustrating the extending LAP according to the invention. At step 51 a request for connecting two data devices A and B is received. The request also comprises the operational parameters regarding the connection, such as the bandwidth, delay, administrative costs, etc. At step 52, the network identifies the maximally disjoint paths (routes) that connect edge nodes 23 and 27 where devices A and B are connected to the network. The routes are, as indicated above, connected by a succession of compatible physical links. In step 53, network 20 selects logical links between the end-points C and D that may satisfy, in aggregation, the request received in step 51. If the logical links are able to satisfy the request, shown at YES on decision block 54, the list of logical links are grouped by interfaces 16' at each node to allow the fault mechanism to communicate any failures of any of the physical links which make up the logical links. communication along these logical links is now possible and the edge devices A and B can now pass data, step 57. If the operation of selecting the logical links is not successful, the network operator is informed in step 55, and the aggregation is ended, step 56.

The present invention also provides for a failure propagation mechanism to support extension of LAP. As discussed above, in an arbitrary MAN mesh, it is not easy to provision physical links for connecting network devices. The faults are detected as shown in step 58 which shows that network 20 continuously exchanges peer information to determine the link state. If a failure is detected inside or at the edge of network 20, step 60, this information is propagated to the edges (internal link failure) or far edge (edge failure) of the network 20 where the user equipment A and B is attached, step 61. The respective edge aggregation ports a, b or c on switching node C, and k, l or m on switching node N are forced into a disabled state, so that the user equipment can detect that a link is down and rapidly react to this condition, by re-distributing the flow from the failed logical link onto the remaining logical links.

If no failure is detected in step 60, the operation of the logical link continues until a request to terminate the service is received in step 62, when the logical link is released. If not, the communication along the logical link continues as shown by branch NO of decision block 62.

The proposed link recovery is fast and allows rapid restoration through alternative route/s selection. The user equipment does not have to wait until the conventional link aggregation—link state protocol detects a timeout condition, generally one second. The conventional mechanism is much slower and may result in the loss of a large amount of data.

Numerous modifications, variations, and adaptations may be made to the particular embodiments of the invention without departing from the scope of the invention which is defined in the claims.

We claim:

1. A method for connecting link aggregation compatible devices over a communication network comprising:
   (a) receiving a request to establish a connection between said devices, said connection being defined by specific traffic parameters;
   (b) detecting a plurality of maximally disjoint paths between said devices, said maximally disjoint paths being formed by compatible physical links; and
   (c) establishing said connection over two or more logical links along a respective two or more maximum disjoint paths and aggregating said logical links into a virtual path having said specific traffic parameters.

2. A method as claimed in claim 1, wherein said specific traffic parameters include the bandwidth of said connection.

3. A method as claimed in claim 1, wherein a maximum disjoint path comprises one or more successive physical links connecting a port of a first device with a corresponding port of a second device and all the nodes of said network, said physical links being selected based on their physical characteristics.

4. A method as claimed in claim 3, wherein a corresponding port is a port having similar specific traffic parameters.

5. A method as claimed in claim 4, wherein one of said specific traffic parameters is the port rate.

6. A method as claimed in claim 2, wherein the sum of the bandwidth of all logical links provides the bandwidth of said connection.

7. A method as claimed in claim 1, wherein (c) comprises:
   selecting a group of one or more logical links for supporting said connection;
   trying to aggregate said logical links of said group into said virtual path;
   in case of failure, ending said link aggregation; and
   in case of success, establishing each said logical links of said group by allocating an input and an output port on each network node along each said maximally disjoint paths, aggregating said logical links into said virtual path, and exchanging traffic between said devices along said virtual path.

8. A method as claimed in claim 1, further comprising:
   monitoring each said logical links of said virtual path for failure; and
   in the case of a failed physical link on any logical link:
   detecting a fault indication at the two end nodes of said failed physical link; and
   signaling said fault indication to a first and a second edge nodes connecting said devices over said network.

9. A method as claimed in claim 1, wherein said communication network is an Ethernet network.

10. A method as claimed in claim 1, wherein said network is a metropolitan area network (MAN).

11. A switching node of a communication network for routing traffic between near end and far end data terminals, comprising:
    a plurality of input ports and output ports, each port having specified traffic parameters;
    a link aggregation interface for assigning an input port and a corresponding output port to a physical route between said near end and said far end data terminals under supervision of a node controller; and
    a switch for routing traffic between said input port and said corresponding output port according to a connectivity map and establishing communication between said near end and said far end data terminals along a logical link, further comprising means for failure detection, wherein said means for failure detection monitors said input port and generates a fault indication whenever said physical route is interrupted upstream from said switching node.

12. A switching node as claimed in claim 11, further comprising means for failure communication, for propagating said fault indication towards edge nodes connecting said data terminals over the network.

13. A switching node as claimed in claim 11, wherein said fault indication is caused by a failed physical link.

14. A switching node as claimed in claim 11, wherein said fault indication is caused by a dead node.

15. A system for connecting link aggregation compatible devices over a communication network comprising:

means for receiving a request to establish a connection between said devices, said connection being defined by specific traffic parameters;

means for detecting a plurality of maximally disjoint paths between said devices, said maximally disjoint paths being formed by compatible physical links; and means for establishing said connection over two or more logical links along a respective two or more maximum disjoint paths and aggregating said logical links into a virtual path having said specific traffic parameters.

16. A system as claimed in claim 15, wherein said specific traffic parameters include the bandwidth of said connection.

17. A system as claimed in claim 15, wherein a maximum disjoint path comprises one or more successive physical links connecting a port of a first device with a corresponding port of a second device and all the nodes of said network, said physical links being selected based on their physical characteristics.

18. A system as claimed in claim 17, wherein a corresponding port is a port having similar specific traffic parameters.

19. A system as claimed in claim 18, wherein one of said specific traffic parameters is the port rate.

20. A system as claimed in claim 16, wherein the sum of the bandwidth of all logical links provides the bandwidth of said connection.

21. A system as claimed in claim 15, wherein said means for establishing connection further comprises:

means for selecting a group of one or more logical links for supporting said connection;

means for trying to aggregate said logical links of said group into said virtual path; and means for ending said link aggregation in the case of an unsuccessful aggregation.

22. A system as claimed in claim 15, wherein said means for establishing connection further comprises:

means for selecting a group of one or more logical links for supporting said connection;

means for trying to aggregate said logical links of said group into said virtual path; and means for establishing each said logical links of said group by allocating an input and an output port on each network node along each said maximally disjoint paths, aggregating said logical links into said virtual path, and exchanging traffic between said devices along said virtual path for a successful aggregation.

23. A system as claimed in claim 15, further comprising:

means for monitoring each said logical links of said virtual path for failure;

means for detecting a fault indication at the two end nodes of said failed physical link in the case of a failed physical link on any logical link; and means for signaling said fault indication to edge nodes connecting said devices over said network.

24. A system as claimed in claim 15, wherein said communication network is an Ethernet network.

25. A system as claimed in claim 15, wherein said network is a metropolitan area network (MAN).

* * * * *